Oct. 26, 1937.   H. J. McINTOSH   2,096,910
DOOR CLOSING MEANS FOR BOTTOM DUMP WAGONS
Filed June 4, 1934   4 Sheets-Sheet 2
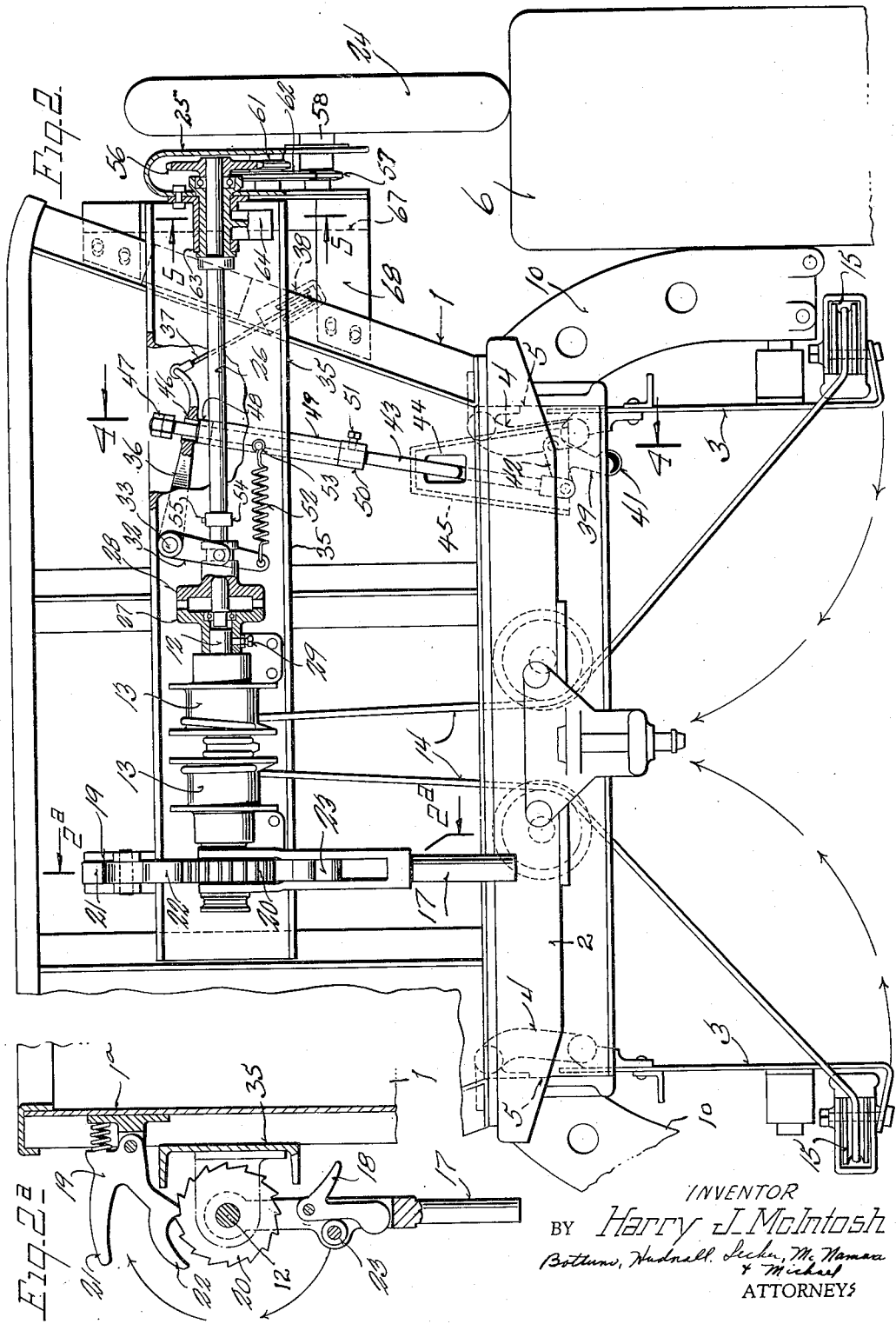
INVENTOR
BY *Harry J. McIntosh*
ATTORNEYS

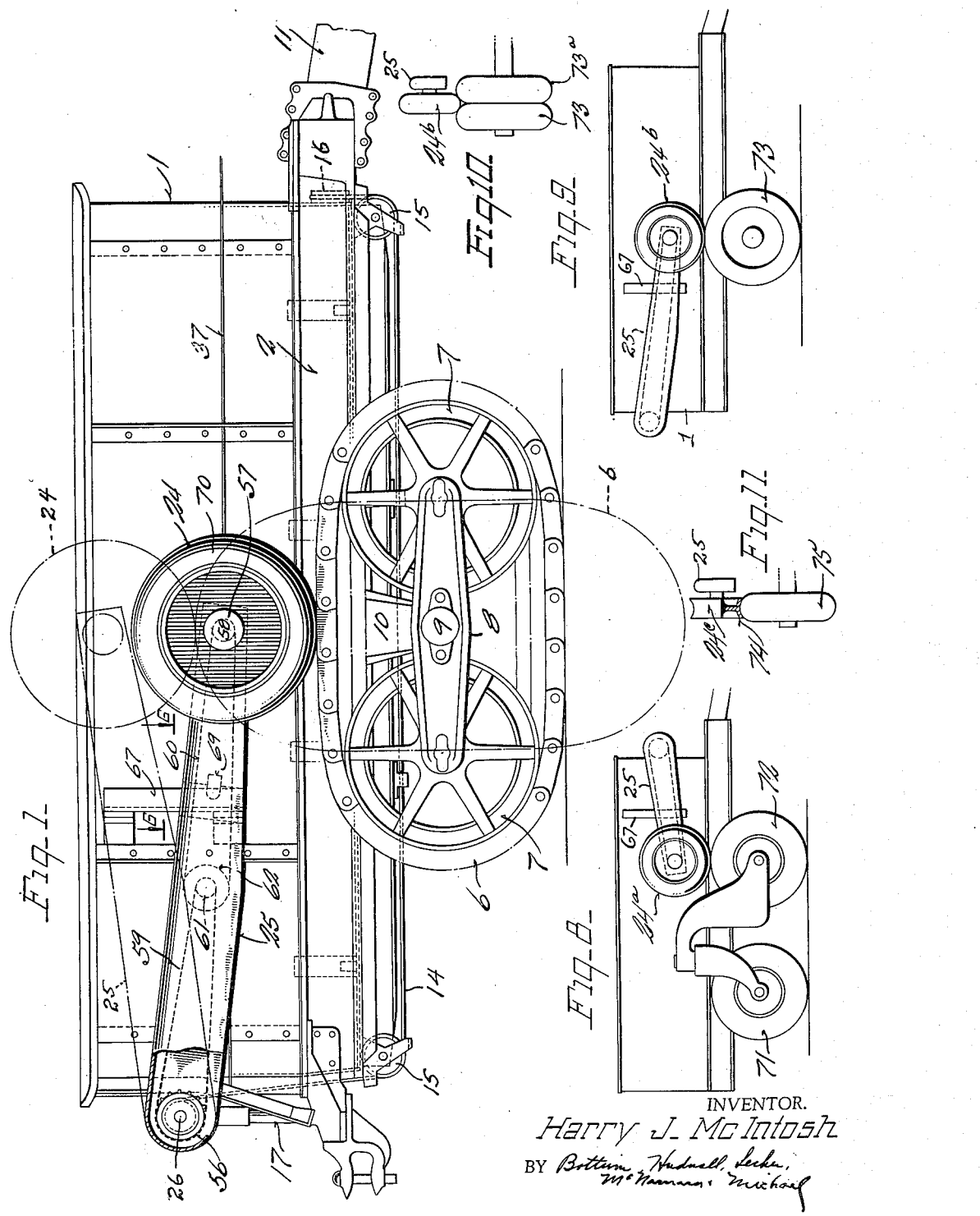

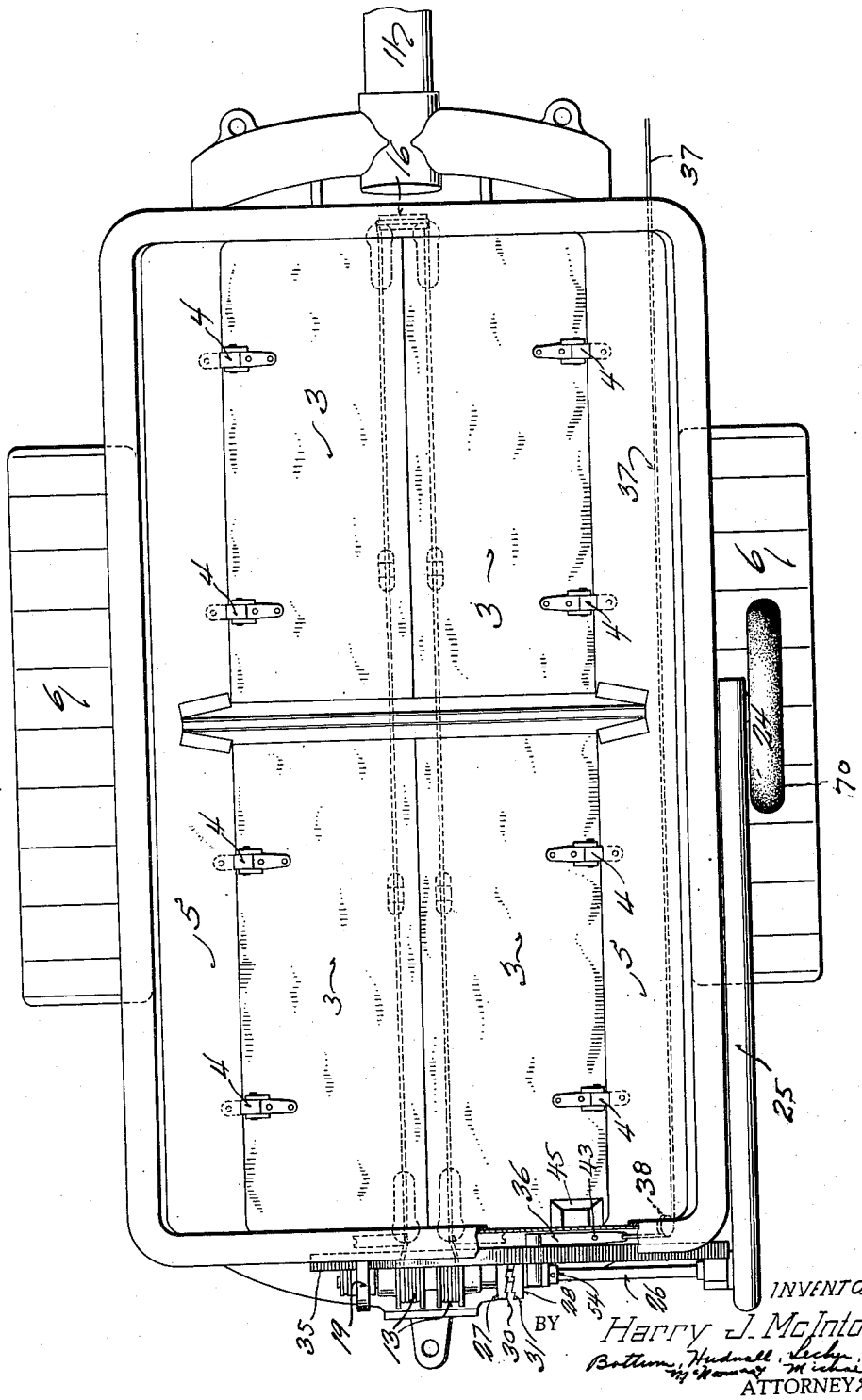

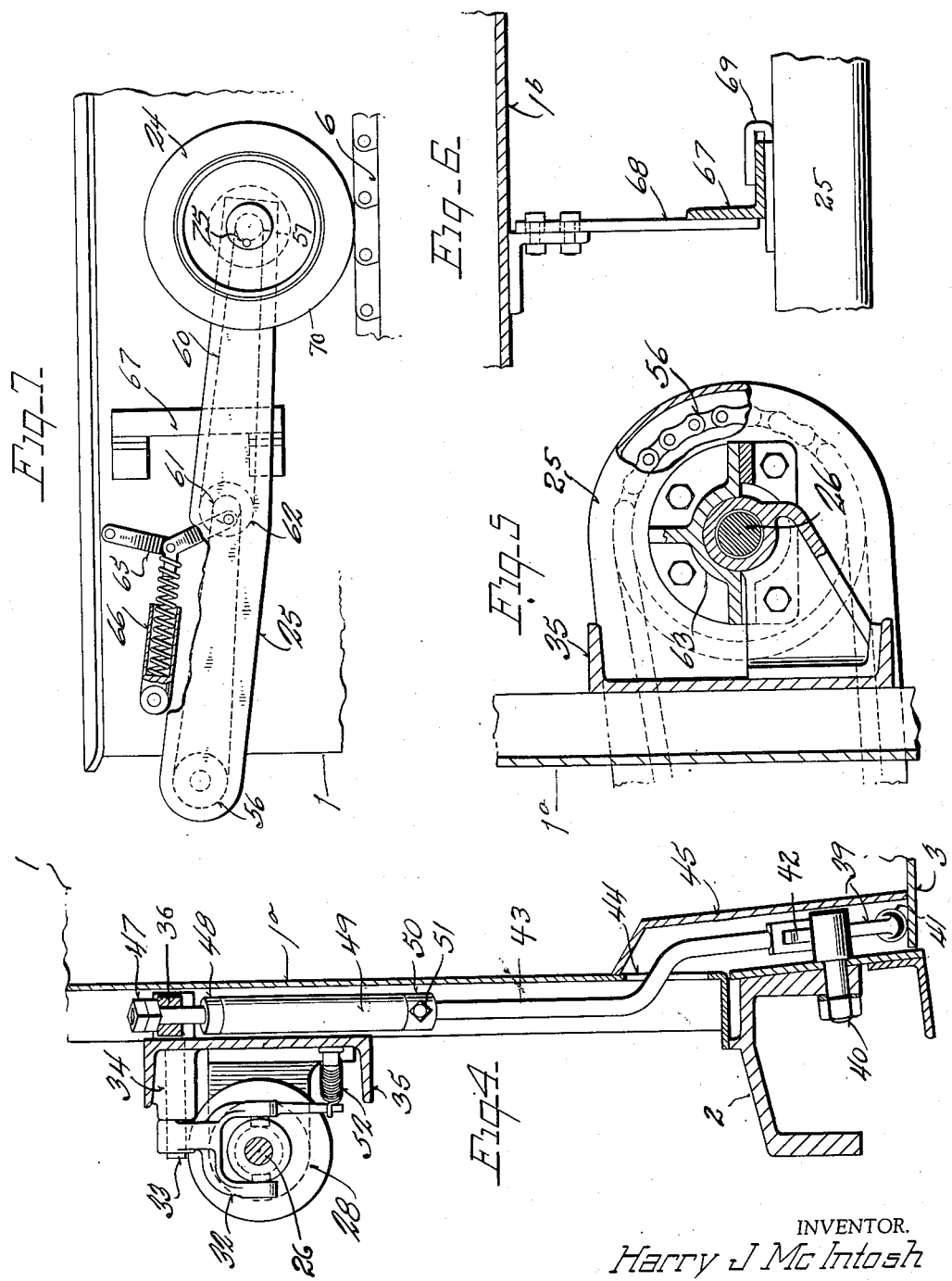

Patented Oct. 26, 1937

2,096,910

UNITED STATES PATENT OFFICE 2,096,910

DOOR CLOSING MEANS FOR BOTTOM DUMP WAGONS

Harry J. McIntosh, West Allis, Wis., assignor to Trackson Company, Milwaukee, Wis., a corporation of Wisconsin Application June 4, 1934, Serial No. 728,867

3 Claims. (Cl. 298—35)

This invention relates to bottom dump wagons of the type used for hauling dirt and the like and which are hitched to and moved by a tractor, motor truck, or other draft means.

The general purpose and object of my invention is to provide means on the wagon whereby the wind-up or closing mechanism for the dumping doors at the bottom of the wagon body may be actuated to close the doors by power furnished by the running gear of the wagon when in motion.

A further object of my invention is to utilize this power by providing the door wind-up or closing means with a rotary driving member, preferably in the form of a wheel, held in frictional contact with the running gear of the wagon for operation thereby.

A further object of my invention is to provide a movable mounting on the wagon body for the driving member whereby it may be maintained in contact with the running gear at all times as the running gear changes position in the movement of the wagon over the ground.

A further object of my invention is to provide the driving member with a resilient tread surface to secure the desired frictional contact between the driving member and the running gear for the maximum tractive effect and also to absorb shocks and jars as the driving member rolls over the irregular surface of the running gear, especially when the latter is of the endless track or crawler type.

A further object of my invention is to so dispose the driving member with respect to the running gear that the axis of rotation of the driving member and the axis of movement of the running gear in changing position in its travel over the roadway will be in alignment to thereby minimize the movement of the driving member with respect to the running gear as the latter changes position.

A further object of my invention is to provide a clutch device in the connection between the driving member and the door closing or wind-up means, whereby the latter may be selectively connected to the driving means.

A further object of my invention is to provide means acting automatically on the doors reaching closed position to release the clutch, and thereby disconnect the door closing means from the power of the running gear without attention by the operator of the tractor or workman on the wagon.

Other and further objects of my invention will appear from the following specification taken in connection with the accompanying drawings, in which:—

Fig. 1 is a side view with parts broken away and in section, respectively, of a bottom dump wagon equipped with a door closing or wind-up mechanism of my invention;

Fig. 2 is an end view of the wagon showing the wind-up mechanism, parts being broken away and in section, respectively;

Fig. 2a is a vertical sectional view, with parts in elevation, taken on line 2a—2a of Fig. 2 to show the door releasing mechanism;

Fig. 3 is a top plan view, partly in section, of the wagon and showing the wind-up means at one end of the wagon;

Fig. 4 is a vertical sectional view taken on line 4—4 of Fig. 2;

Fig. 5 is an enlarged vertical sectional view taken on line 5—5 of Fig. 2;

Fig. 6 is a horizontal sectional view taken on line 6—6 of Fig. 1;

Fig. 7 is a side view with parts broken away and in section, respectively, showing a form of means which may be employed for holding the rotary driving member of the wind-up means in frictional engagement with the running gear of the wagon;

Figs. 8 and 9 show two modifications of my invention, the modifications illustrating the adaptation of the invention to running gears other than of the crawler type as shown in the preceding figures; and Figs. 10 and 11 illustrate further modifications to be hereinafter described.

In the drawings, 1 indicates the body of the wagon constructed of sheet steel plates and mounted on a supporting frame 2. The bottom of the wagon body comprises a set of dumping doors 3, 3 hinged by links 4, 4 to the side members 5, 5 of the frame and swingable from a raised position within the frame closing the bottom of the wagon body to a lowered position extending vertically downward from the frame to open the bottom of the wagon body for dumping the same as shown in Fig. 2. The frame is supported at the desired height above the ground so that doors may swing downwardly by a running gear, which as shown in Figs. 1 to 3, comprises crawlers on opposite sides of the wagon. Each crawler comprises an endless track or tread member 6 supported by and running over wheels 7, 7. The latter are connected in tandem at each side of the wagon by a beam structure 8 pivotally supported between the wheels on a stub axle 9 carried by a hanger 10 secured to the adjacent side member 5 of the frame intermediate the ends of the wagon. The crawlers provide a mobile support for the wagon and the latter is provided at its front end with a draw bar structure 11 by means of which the wagon is connectable with a tractor or equivalent draft apparatus.

The wind-up mechanism for the doors is located at one end of the wagon, preferably at the rear end as shown in the drawings. This mechanism comprises a shaft 12 on the wagon and supporting a pair of winding drums 13, 13 keyed or otherwise fixed to the shaft for rotation thereby. The doors 3, 3 are connected with the drums by a cable 14. The cable is engaged with the doors through sheaves 15, 15 thereon and has its ends connected with and wrapped about the respective drums, as shown. At the front end of the wagon, the cable is looped about a sheave 16 mounted on the wagon frame 2 between the doors, as shown in dotted lines in Fig. 3. By this arrangement, a single cable may be employed for the doors.

For rotating the drums by hand in case it is desired to close the doors by a manual operation, a hand lever 17 is rotatably supported about the shaft 12 at the drum assembly, as shown. Pawls 18 and 19 are associated with this lever and have operative engagement with the teeth of a ratchet wheel 20 keyed or otherwise fixed to the shaft 12. Pawl 18 is the operating or driving pawl, being carried by the lever and serving to rotate the ratchet wheel to wind up the doors on swinging the lever in a counter-clockwise direction. Pawl 19 is the holding pawl, preventing reverse rotation of the drums, except when it is desired to open the doors, in which case both pawls are released from the ratchet wheel so that the doors may swing open by gravity plus the weight of the load on the doors when dumping the wagon. The pawl and ratchet mechanism is detailed in Fig. 2a. As illustrated, the pawl 18 is weighted to maintain it engaged with the ratchet wheel when winding up the doors. When the lever 17 is idle it hangs downwardly from the shaft 12 and the weight on the pawl 18 holds the pawl out of engagement with the ratchet wheel. The pawl 19 is located above the ratchet wheel, being mounted on the adjacent end wall 1a of the wagon body and spring pressed into engagement with the ratchet wheel as shown. The pawl 19 has a pair of outwardly projecting fingers 21, 22 vertically spaced to receive between them the pawl 18 and a fixed abutment 23 on the lever 17 adjacent said pawl. This occurs when the hand lever is raised from its lowered position as shown in the drawings to a position extending above the ratchet wheel. When the lever is swung to its upper position, both pawls by the raising of the lever are moved out of engagement with the ratchet wheel to release the doors to swing open. Pawl 19 is raised out of engagement with the ratchet wheel by the abutment 23 contacting with the underside of the upper finger 21, while the pawl 18 is raised from the ratchet wheel by riding over the upper edge of the lower finger 22 which is carried upward in the raising of the pawl 19. Thus both pawls are automatically released from the ratchet and the doors are freed to open automatically. To wind up the doors by the lever 17, the latter is oscillated back and forth about the shaft 12 with the pawl 18 engaged with the ratchet wheel.

The tread members 6 of the crawlers move when the wagon is moved by the tractor and to utilize the power so generated by the running gear to wind up the doors 3, I provide a rotary driving member 24 in the form of a rubber tired wheel disposed above one of the crawlers and in frictional contact with the movable tread member thereof. The wheel 24 is carried by an arm 25 exterior of the wagon body at one side and extending from the wheel to the rear of the wagon where the arm is journaled for vertical movement about the axis of a driving shaft 26 for the door wind-up means. Shaft 26, as shown in Fig. 2, is in alignment with the drum shaft 12 and is selectively connectible therewith by a clutch device which in the form shown in the drawings, comprises a pair of separable clutch members 27, 28. The clutch member 27 is fixed to the shaft 12 as by a set screw 29 and has a set of clutch teeth 30 to engage a complementary set of clutch teeth 31 on the other clutch member 28 as shown in Fig. 3. The clutch member 28 is splined on the shaft 26 for movement into and out of clutched engagement with the clutch member 27. The means employed for this purpose comprises a shifter fork 32 having pins engaging the clutch member 28 in an annular groove therein as shown in Figs. 2 and 4. The fork 32 is secured to a rock shaft 33 journaled in a bearing lug 34 provided on a structural channel member 35 secured to the wagon body to support the wind-up means. The fork 32 is actuated by an arm 36 secured at one end to the rock shaft 33 and having a cable 37 attached to its other end. This cable passes under a pulley or sheave 38 at the end of the wagon provided with the wind-up means and extends to the tractor to which the wagon is connected when in use. Thus the operator of the tractor without leaving the same may engage the clutch for closing the doors 3 of the wagon by power furnished by its running gear.

To automatically release the clutch when the doors reach their closed positions, I provide a trip mechanism which as shown in Fig. 2, comprises a bell crank lever 39 fulcrumed within the frame 2 on a pin 40 adjacent one of the doors. The lever is so disposed that its lower arm 41 is in the path of upward movement of one of the doors. The other or upper arm 42 of the lever is pivoted to the lower end of a rod 43. The latter extends to the outer side of the wagon at the end where the wind-up mechanism is located through an opening 44 in the end wall 1a of the wagon body as shown in Fig. 4. The lever 39 and the lower portion of the rod 43 are protected from contact with the load in the wagon by a shield 45. Rod 43 extends upwardly along the end wall of the wagon body to the rear of the supporting member 35 and passes through an aperture 46 in the arm 36 as shown in Fig. 2. Rod 43 carries an abutment 47 above the arm 36 and an abutment 48 below the arm whereby the rod in its endwise movements will move the arm to engage and disengage the clutch members 27, 28. The upper abutment 47 may be in the form of one or more clamp nuts applied to the threaded upper end of the rod. The lower abutment 48 may be in the form of a collar held in place on the rod by a spacer sleeve 49 resting on collar 50 clamped on the rod by a set screw 51. Cooperating with the movable clutch member 28 is a tension spring 52. Said spring has one end connected with the shifter fork 32 and the other end anchored on the channel support 35 by a stud 53. The spring exerts a constant outward pull on the fork 32 to establish a definite clearance between the clutch jaws when the clutch members are disengaged so as to prevent any possibility of the jaws striking when the doors 3 are dumped.

To engage the clutch members 27, 28, the outer end of the arm 36 is pulled downwardly by the cable 37 at the tractor. The fork 32 is rocked toward the clutch and moves clutch member 28 into engagement with clutch member 27. This places an additional tension on the spring 52, but the friction between the clutch jaws is sufficient to prevent the spring from pulling the jaws apart. With the clutch jaws engaged, rotation of the shaft 26 will rotate the drums 13 and the doors 3 will be raised to close the bottom of the wagon body. Shaft 26 is rotated by the driving wheel 24 when the wagon is moved through a driving connection between said shaft and said wheel to be presently described. When one of the doors strikes the bell-crank 39, arm 42 is raised, pushing rod 43 upwardly and raising the outer end of arm 36 to draw clutch member 28 out of engagement with clutch member 27. Spring 52 then instantly pulls the clutch member 28 farther away from the clutch member 27 until it stops against a collar 54 fixed in the desired position on the shaft 26 by a set screw 55, as shown.

The clutch is thrown out when the doors reach their closed positions, and power on the wind-up mechanism is instantly released. The additional movement required of the clutch member 28 by the spring 52 is allowed by the clearance provided between the upper and lower abutments 47, 48 on the rod 43. The spring 52 also holds the arm of the fork against the upper abutment 47 so that the parts are positioned to close the clutch on a pull on the cable 37. If the doors 3 are now dumped, the combined weight of the rod 43, collars 47, 48, spacer sleeve 49, and lever 39 hang on the arm 36 of the shifter fork and endeavor to engage the clutch. Spring 52 must be of sufficient strength to off-set this tendency. When the cable 37 is pulled to engage the clutch, the above mentioned parts drop.

Shaft 26 is driven from the wheel 24 by any desired form of drive which, as shown in the drawings, is a chain drive. This drive is located in the arm 25, the latter being in the form of a housing to cover and protect the drive as shown. Sprocket wheels 56, 57 are provided for this drive on the shaft 26 and the axle member 58 of the driving wheel 24, respectively, as shown in Fig. 2. This axle member is carried by the arm 25 and supports the wheel 24 on the arm at or adjacent its outer or free end as shown. One chain with a wheel 24 of the proper diameter would be sufficient to connect the sprocket wheels 56, 57, but with a small wheel two chains 59, 60 and additional sprocket wheels 61, 62 of the desired sizes intermediate the ends of the arm 25 are employed for a reduction of leverage. Of the intermediate sprockets, the smaller one 61 is connected by the chain 59 with the sprocket wheel 56 on the shaft 26. The larger sprocket 62 is connected by the second chain 60 with the sprocket wheel 57 at the wheel 24.

The arm 25 at the shaft 26 is provided with a sleeve 63 journaled on the bearing 64 for the shaft to pivotally support the arm about the axis of the shaft. This bearing is carried by the supporting channel 35 and is disposed at the end of the shaft where the shaft extends beyond the side of the wagon for connection with the drive chain 59 as shown. Mounting the arm on the shaft bearing, instead of on the shaft, releases the shaft of the side thrusts of the arm and the wheel as the wheel rolls in contact with the crawler tread. If desired, the arm 25 could be mounted about a jack shaft connected by a reduction with the drive shaft 26.

The weight of the arm 25 and the wheel 24 is usually sufficient to hold the wheel in engagement with its tread member 26, although I may, if necessary provide additional means for holding the parts frictionally engaged. A means for this purpose is illustrated in Fig. 7 wherein 65 indicates a toggle pivotally connected to the arm 25 and to the adjacent side of the wagon body. Spring means 66 is carried by the wagon body for urging the toggle in a direction to hold the wheel 24 in driving engagement with the tread member of the wagon.

To stiffen the arm 25 against lateral displacement, I provide a guide for the arm as shown in Figs. 1 and 6. This guide includes an angle bar or equivalent member 67 secured by brackets 68 to the adjacent side wall 1b of the wagon body in sufficient outward spaced relation therefrom so that an angle member 69 secured to the inner side of the arm 25 may engage about the bar 67 and hold the arm from sidewise movement. The arm 25 is relatively long because it must extend from an end to approximately the middle of wagon where the wheel 24 is disposed to engage the part of the running gear which turns it.

With the wheel 24 constantly in contact with one of the tread members of the wagon, the wheel will be revolved when the wagon is moved. Thus power will be furnished by the wagon for winding up the dumping doors when the clutch connects the winding shafts. With the wheel 24 carried by the arm 25, the wheel may move up and down in response to the change in position of the tread member and follow the tread member should it completely reverse its position as indicated by the dot and dash lines in Fig. 1. This frequently occurs as the wagon is pulled over rough ground and especially when moving over a pronounced obstruction, either a stone or log in the path of movement. The guide 67 for the arm is made long enough to accommodate this extreme movement on behalf of the wheel as shown in Fig. 1.

To secure the desired frictional engagement between the driving wheel and the running gear, the wheel, as before-stated, is rubber tired or has a resilient tread surface. This is provided by equipping the wheel with a pneumatic tire 70 of the character used on motor vehicles. A tire of this character has a tread surface of a width and character to conform to the irregular surface of a crawler tread in particular and insures the desired driving connection for operating the wind-up means from the running gear of the wagon. Moreover, a pneumatic tire absorbs the shocks and jars as the driving member rolls over the irregular surface of the crawler and thus reduces the wear and tear on the arm 25 and the bearing assembly by means of which the wheel is journaled on the arm. To minimize the amount of movement of the driving member to follow the adjacent tread surface of the running gear member as the latter changes position when traveling over a rough ground, I dispose the driving member with its axis of rotation in line with the axis about which the running gear member changes position. When the running gear member is in the form of a crawler as shown in the drawings, the axis 58 of the driving member is located in vertical alignment with the pivotal axis 9 of the crawler.

In Figs. 8 and 9 I have shown the door closing mechanism of my invention applied to a wagon having a running gear of a character different than that shown in the preceding figures. In Fig. 8 the running gear is in the form of a caster assembly comprising a tractor wheel 71 and a caster wheel 72. The latter may be employed to furnish the power for the door closing mechanism, the driving wheel 24a of that mechanism being shown in contact with the wheel 72.

In Figs. 9 and 10 I have shown a wagon having a gear of regular round tread wheels 73. These wheels may be steel or single or dual pneumatic tires. In the case of dual pneumatic tires, as shown at 73, 73a in Fig. 10, the driving member 24b for the door closing mechanism may contact either the top surface of one tire or may run in the channel between the two tires. In this application of round wheel gear on the wagon, the entire mechanism may be somewhat simplified, as the arm 25 need oscillate through a small range only and the need for a guide like 67 is minimized, as in the case of dual pneumatic tire gear the trough or channel between same may be utilized as a guide and in the case of single pneumatic tire gear, the driving member 24c may be a steel wheel with a trough shaped rim 74 contacting the rubber tire gear 75 of the wagon, in place of being a pneumatic tired wheel, as illustrated in Fig. 11.

The guide for the arm 25 may be incorporated in connection with the spring construction for putting pressure on the drive wheel. The drive wheel may be weighted within the wheel itself, or through weights applied to the arm, so as to eliminate the necessity for a spring, and if a spring is used, it may preferably be adjustable so that the pressure can be regulated according to traction condition encountered in service.

As a safety feature, I may incorporate a shear pin in the connection between the driving wheel and its sprocket wheel, as indicated at 75 in Fig. 7. The advantage of this arrangement is that should doors 3, in being raised to closed position, become clogged, which is likely to happen, to the point where the resistance to the closing force is greater than traction available, the shear pin, instead of any of the driving mechanism, will break and protect the parts from these undue strains. Also this will prevent wearing out of tire, if tire were to be held stationary and under load over the revolving gear.

A friction clutch may be substituted for the jaw clutch shown, in which case the clutch itself would serve as a safety factor in place of a shear pin, and the wheel in that case would be provided with an overrunning bearing which would function when the wagon is backed up. With the jaw clutch, as shown, the clutch will automatically disengage when the wagon is backed up.

The clutch throw-out mechanism, instead of being associated with only one door, as herein shown and described, could by the arrangement of a rocker arm be associated with both doors. It would be of advantage to have the throw-out mechanism arranged near the center of the doors, where the doors are supported by closing cable, to avoid deflection of the doors delaying the operation of releasing the clutch.

Among the advantages of my improvements are the following:

The construction is simple. There are no complicated parts and the mechanism can be readily adjusted or repaired by the average workman. The door closing mechanism is an integral part of the wagon, there being no connection with the tractor other than the operating cable 37. This eliminates damage to the door closing device when the connection between the wagon and tractor is disrupted due to breakage of couplings. Moreover, the wagon can be pulled by a standard tractor, as no special accessories such as pump, power take-offs, etc., are required on the tractor to operate the door closing means. The speed of closing the doors can be varied, if necessary, to meet varied conditions by merely changing the gear ratios and applying the necessary weight or spring pressure on the driving wheel. The latter will function under all conditions and closes the wagon doors regardless of the contour of the ground over which the wagon is moved. Furthermore, the action of the door closing means is in no way dependent upon the position or relation of the wagon with respect to the tractor and thus the doors may be closed regardless of the angle between the tractor and the wagon.

The mechanism is safe in that the doors will not close until the wagon is put in motion, thus avoiding injury to an operator while in the wagon cleaning off mud or scraping away the accumulated load, as no opportunity is afforded for the doors to close automatically after the dumping of the load. Moreover, closing the doors by power furnished by the wagon, enables the doors to be closed even under conditions, where the mud sticks to the doors, the power furnished through the running gear of the wagon is sufficient to overcome this resistance.

Another important advantage of my invention is that no changes are necessary to convert the ordinary hand door closing means on a wagon to one operable by a power wheel of my invention except for suitably coupling the extension shaft to the hand wind-up shaft. Moreover, with the hand operated mechanism retained in the wind-up mechanism, the doors may be closed manually should the power device be temporarily tied up due to breakage or other cause. In all of the constructions illustrated, the drive may be to the front or to the rear of the wagon.

The details of construction and arrangement of parts shown and described may be variously changed and modified without departing from the spirit and scope of my invention, except as pointed out in the appended claims.

I claim as my invention:

1. A discharge door closing mechanism for bottom dump wagons, comprising in combination with the dumping doors and the running gear of the wagon of means on the wagon for closing the doors and having relatively rotatable driving and driven shafts and clutch means having separable jaw clutch members for selectively connecting said shafts, means for rotating the driving shaft from the running gear of the wagon, an actuator for engaging and disengaging the clutch members, said actuator having an arm, a rod passing through said arm and adapted to be moved upwardly by one of the doors on closing the same, abutments on the rod for moving the arm, and a spring tension for maintaining the clutch members out of engagement when disengaged, said abutments being so spaced that the arm may move with respect to the rod under the action of the spring tension.

2. In a dump wagon of the class described having a dumping door and wind-up mechanism therefor and running gear, a power take-off for connectively associating said mechanism with said running gear, comprising a housing journaled to said wagon, a driving shaft extending from within said housing coaxially with said journaled connection to the exterior thereof, the exterior end of said shaft being adapted for connection with said mechanism, an axle member supported by said housing and spaced from said shaft, said axle having a portion within and a portion exterior of said housing, a rotary driving member mounted on the exterior portion of said axle and adapted to frictionally engage said running gear and be rotated thereby, and positive reduction drive means within said housing and operatively connecting the interior portions of said shaft and axle.

3. In a dump wagon of the class described having a dumping door and wind-up mechanism therefor and running gear, a power take-off for connectively associating said mechanism with said running gear, comprising a housing, a drive axle and a driven shaft in said housing and extending exteriorly thereof, means contained within said housing forming a positive reduction drive connection between said axle and said shaft, and a rotary drive member exterior of said housing and fixed on said axle, said housing being journaled to said wagon and movable as a unit about said journaled connection to permit said drive member to frictionally engage said running gear, said driven shaft being adapted for connection with said mechanism throughout any movement of said housing about said journaled connection.

HARRY J. McINTOSH.